(12) United States Patent
Yasutake et al.

(10) Patent No.: US 8,828,339 B2
(45) Date of Patent: Sep. 9, 2014

(54) CO SHIFT CATALYST, CO SHIFT REACTOR, AND METHOD FOR PURIFYING GASIFIED GAS

(75) Inventors: Toshinobu Yasutake, Tokyo (JP); Masanao Yonemura, Tokyo (JP); Tetsuya Imai, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/519,683

(22) PCT Filed: Feb. 24, 2011

(86) PCT No.: PCT/JP2011/054167
§ 371 (c)(1),
(2), (4) Date: Jun. 28, 2012

(87) PCT Pub. No.: WO2011/105501
PCT Pub. Date: Sep. 1, 2011

(65) Prior Publication Data
US 2012/0294789 A1    Nov. 22, 2012

(30) Foreign Application Priority Data
Feb. 24, 2010  (JP) ................. 2010-039412

(51) Int. Cl.
| | | |
|---|---|---|
| *B01J 23/28* | (2006.01) |
| *B01J 23/745* | (2006.01) |
| *B01J 23/46* | (2006.01) |
| *B01J 23/755* | (2006.01) |
| *B01J 8/00* | (2006.01) |
| *C01B 3/12* | (2006.01) |
| *C01B 3/16* | (2006.01) |
| *B01J 23/887* | (2006.01) |
| *B01J 23/883* | (2006.01) |
| *B01J 37/02* | (2006.01) |
| *F02C 6/18* | (2006.01) |
| *C10K 3/04* | (2006.01) |
| *F22B 1/18* | (2006.01) |
| *C10K 1/00* | (2006.01) |
| *B01J 23/89* | (2006.01) |
| *C10J 3/00* | (2006.01) |
| *C10K 1/02* | (2006.01) |
| *C10K 3/02* | (2006.01) |
| *B01J 23/652* | (2006.01) |
| *F02C 3/28* | (2006.01) |
| *B01J 23/83* | (2006.01) |
| *F01K 23/06* | (2006.01) |
| *C10K 1/08* | (2006.01) |
| *B01J 37/03* | (2006.01) |
| *B01J 21/06* | (2006.01) |

(52) U.S. Cl.
CPC ............ *B01J 23/755* (2013.01); *B01J 23/8871* (2013.01); *B01J 23/883* (2013.01); *B01J 37/0201* (2013.01); *C01B 3/16* (2013.01); *B01J 21/066* (2013.01); *F02C 6/18* (2013.01); *C10K 3/04* (2013.01); *F22B 1/1815* (2013.01); *C10K 1/005* (2013.01); *B01J 23/8906* (2013.01); *Y02E 20/18* (2013.01); *C10J 3/00* (2013.01); *C10K 1/024* (2013.01); *C10K 1/004* (2013.01); *C10K 3/02* (2013.01); *B01J 23/6525* (2013.01); *F02C 3/28* (2013.01); *B01J 21/063* (2013.01); *Y02C 10/04* (2013.01); *Y02E 20/16* (2013.01); *B01J 23/83* (2013.01); *F01K 23/067* (2013.01); *C10K 1/08* (2013.01); *B01J 37/035* (2013.01); *B01J 37/031* (2013.01)
USPC ............ 423/210; 423/240 R; 423/215.5; 423/220; 423/246; 423/247; 423/655; 423/656; 422/168; 422/177; 502/315; 502/326; 502/335

(58) Field of Classification Search
USPC .......... 423/210, 240 R, 215.5, 220, 246, 247, 423/655, 656; 422/168, 177; 502/315, 326, 502/335
See application file for complete search history.

(56) References Cited

U.S. PATENT DOCUMENTS

| | | | |
|---|---|---|---|
| 4,153,580 A | 5/1979 | Hausberger et al. | |
| 4,233,180 A | 11/1980 | Hausberger et al. | |
| 4,906,448 A * | 3/1990 | Sauvion et al. | 423/437.2 |
| 7,147,680 B2 * | 12/2006 | Taguchi et al. | 48/61 |
| 7,160,534 B2 * | 1/2007 | Hagemeyer et al. | 423/655 |
| 7,166,263 B2 | 1/2007 | Vanderspurt et al. | |
| 2003/0186805 A1 | 10/2003 | Vanderspurt et al. | |

FOREIGN PATENT DOCUMENTS

| | | | | |
|---|---|---|---|---|
| CN | 1219500 A | 6/1999 | | |
| CN | 1457320 A | 11/2003 | | |
| JP | 56-125485 A * | 10/1981 | | C10K 3/02 |
| JP | 56-48553 B2 | 11/1981 | | |
| JP | 59-2537 B2 | 1/1984 | | |
| JP | 4-66611 B2 | 10/1992 | | |
| JP | 2003-73107 A | 3/2003 | | |
| JP | 2003-080072 B2 | 3/2003 | | |
| JP | 2004-331701 A | 11/2004 | | |
| JP | 2005-521617 A | 7/2005 | | |
| JP | 2006-181473 A * | 7/2006 | | B01J 23/89 |
| JP | 4015391 B2 | 11/2007 | | |
| JP | 2009-90184 A | 4/2009 | | |

OTHER PUBLICATIONS

Australian Office Action dated Feb. 26, 2013, issued in corresponding Australian Patent Application No. 2011221123 (3 pages).
International Search Report of PCT/JP2011/054167, mailed May 17, 2011.
Translation of the Written Opinion of the International Searching Authority of PCT/JP2011/054167, mailed May 17, 2011.
Japanese Office Action dated Nov. 5, 2013, issued in corresponding Japanese Patent Application No. 2012-501852, w/ English translation.
M. Laniecki et al., "Water-gas shift reaction over sulfided molybdenum catalysts supported on TiO2-ZrO2 mixed oxides: Support characterization and catalytic activity", Catalysis Today, vol. 116, pp. 400-407 (2006); cited in Japanese Office Action dated Nov. 5, 2013.
M. Laniecki, et al., "Water-gas shift reaction over sulfided molybdenum catalysts: I. Alumina, titania and zirconia-supported catalysts", Applied Catalysis A: General, vol. 196, pp. 293-303 (2000); cited in Japanese Office Action dated Nov. 5, 2013.
Chinese Office Action dated Jul. 22, 2013, issued in corresponding Chinese Patent Application No. 201180004717.8, w/ English translation.
Decision to Grant a Patent dated Apr. 22, 2014, issued in corresponding Japanese Patent Applidation No. 2012-501852 with English Translation (4 pages).
Australian Notice of Allowance dated Apr. 30, 2014, issued in corresponding Australian Patent Application No. 2011221123 (3 pages).
Office Action dated May 9, 2014, issued in Corresponding Chinese Patent Application No. 201180004717.8, with English Translation (17 pages).

* cited by examiner

*Primary Examiner* — Timothy Vanoy
(74) *Attorney, Agent, or Firm* — Westerman, Hattori, Daniels & Adrian, LLP

(57) ABSTRACT

A CO shift catalyst according to the present invention is one that reforms carbon monoxide (CO) in gas. The CO shift catalyst includes: active ingredients including one of molybdenum (Mo) and iron (Fe) as a main ingredient and one of nickel (Ni) and ruthenium (Ru) as an accessory ingredient; and one or at least two oxides of titanium (Ti), zirconium (Zr), and cerium (Ce) as a carrier supporting the active ingredients. The CO shift catalyst can be used for a CO shift reactor 20 that converts CO in gasified gas 12 produced in a gasifier 11 into $CO_2$.

3 Claims, 4 Drawing Sheets

US 8,828,339 B2

CO SHIFT CATALYST, CO SHIFT REACTOR, AND METHOD FOR PURIFYING GASIFIED GAS

FIELD

The present invention relates to a CO shift catalyst that converts CO contained in gasified gas into $CO_2$, to a CO shift reactor, and to a method for purifying gasified gas.

BACKGROUND

Effective utilization of coal has attracted attention as one of the possible solutions to recent energy issues.

To convert coal to a highly value-added energy medium, advanced technologies, such as a coal gasification technology and a gas purification technology, are required.

An integrated coal gasification combined cycle system that generates electricity using gasified gas has been proposed (Patent Literature 1).

The integrated coal gasification combined cycle (IGCC) is a system that converts coal into combustible gas in a high-temperature and high-pressure gasifier and generates electricity through a combined cycle with a gas turbine and a steam turbine by using the gasified gas as fuel.

Examples of such a cycle are illustrated in FIGS. 3 and 4. FIG. 3 is an explanatory diagram showing a coal gasification power plant, and FIG. 4 is an explanatory diagram showing another coal gasification power plant.

As illustrated in FIG. 3, the coal gasification power plant 100-1 gasifies coal 101 in a gasifier 102 to obtain gasified gas 103 as synthesis gas, reduces the amount of dust in a dust removal apparatus 104, converts COS into $H_2S$ in a COS converter 105, causes a CO shift reaction to occur in a CO shift reactor 106, and recovers $CO_2$ and reduces the amount of $H_2S$ in the gas in an $H_2S/CO_2$ recovery apparatus 107. In FIGS. 3 and 4, reference numeral 120 denotes air, 121 denotes an air separator for separating the air into nitrogen ($N_2$) and oxygen ($O_2$), 122 denotes a gasification air compressor, 123 denotes gasification air, 124 denotes steam, and 125 denotes an $H_2S/CO_2$ treatment system.

Synthesis gas 108 obtained through treatment by the $H_2S/CO_2$ recovery apparatus 107 is supplied to a combustor 111 in a gas turbine 110 used as power generating means and is then combusted. High-temperature and high-pressure combustion gas is thereby produced and used to drive a turbine 112. The turbine 112 is connected to a power generator 113, so that the power generator 113 generates electricity when the turbine 112 is driven. Flue gas 114 that has driven the turbine 112 has a temperature of 500 to 600° C. Therefore, it is preferable to feed the flue gas to an HRSG (Heat Recovery Steam Generator (an exhaust heat recovery boiler)) 115 in order to recover heat energy. In the HRSG 115, steam is produced by the heat energy of the flue gas, and the produced steam drives a steam turbine 116. The flue gas from which heat energy has been recovered by the HRSG 115 is fed to a denitrification apparatus (not shown) to reduce the amount of NOx in the flue gas and thereafter released into the air through a stack 117.

As described above, before $CO_2$ is separated, the gasified gas 103 obtained through the gasification in the gasifier 102 must be subjected to the CO shift reactor 106 that generates hydrogen ($H_2$) from carbon monoxide (CO) and steam ($H_2O$) contained in the gasified gas 103.

The CO shift reaction is represented by the following formula (1) and performed to obtain $CO_2$ and $H_2$ as useful components.

$$CO + H_2O \rightarrow CO_2 + H_2 \quad (1)$$

The CO shift reactor 106 converts CO contained in a large amount in the gasified gas 103 into $H_2$. Thus, the purified gas having a composition suitable not only as turbine gas but also for the synthesis of chemical products such as ethanol and ammonia can be obtained.

In the coal gasification power plant 100-1 shown in FIG. 3, the CO shift reactor 106 including the CO shift catalyst is disposed between the COS converter 105 and the $H_2S/CO_2$ recovery apparatus 107 (on the upstream side of the $H_2S/CO_2$ recovery apparatus 107). However, the CO shift reactor 106 may be disposed on the downstream side of the $H_2S/CO_2$ recovery apparatus 107, as in another proposed coal gasification power plant 100-2 shown in FIG. 4.

CITATION LIST

Patent Literature

Patent Literature 1: Japanese Patent Application Laid-Open No. 2004-331701

Patent Literature 2: Japanese Patent Publication No. Sho. 59-2537

SUMMARY

Technical Problem

When the CO shift reactor 106 is disposed on the upstream side of the $H_2S/CO_2$ recovery apparatus 107 as shown in FIG. 3, a cobalt (Co)-molybdenum (Mo)-based catalyst that is activated when the CO shift catalyst is sulfurized can be used because a large amount of $H_2S$ (about 1,000 ppm) is present. However, when the CO shift reactor 106 is disposed on the downstream side of the $H_2S/CO_2$ recovery apparatus 107 as shown in FIG. 4, the amount of $H_2S$ has been reduced, so that the degree of sulfurization is insufficient. This results in a problem in that sufficient catalytic performance is not obtained.

A copper (Cu)-zinc (Zn)-based catalyst, which is a typical CO shift catalyst, is poisoned in a sulfur component (S component) atmosphere. Therefore, such a catalyst has a problem in that it cannot be used when the CO shift reactor 106 is disposed on the downstream side of the $H_2S/CO_2$ recovery apparatus 107 as shown in FIG. 4.

Accordingly, it has been demanded to develop a CO shift catalyst that has high S resistance and uses a large-specific surface area carrier to stabilize the catalytic performance when the concentration of $H_2S$ is in the range of 0.1 to 100 ppm and preferably 0.5 to 50 ppm.

In view of the above problems, it is an object of the present invention to provide a CO shift catalyst that has high S resistance and can exert stable catalytic performance even when the concentration of $H_2S$ is low. It is another object to provide a CO shift reactor and a method for purifying gasified gas.

Solution to Problem

According to an aspect of the present invention, a CO shift catalyst that reforms carbon monoxide (CO) in a gas includes: active ingredients including one of molybdenum (Mo) and iron (Fe) as a main ingredient and one of nickel (Ni) and ruthenium (Ru) as an accessory ingredient; and one or at least two oxides of titanium (Ti), zirconium (Zr), and cerium (Ce) as a carrier supporting the active ingredients.

Advantageously, in the CO shift catalyst, the carrier contains a complex oxide includes at least two elements.

Advantageously, in the CO shift catalyst, an amount of the supported main ingredient of the active ingredients is 0.1 to 25% by weight, and an amount of the supported accessory ingredient is 0.01 to 1.5% by weight.

According to another aspect of the present invention, a CO shift reactor includes a reactor filled with the CO shift catalyst.

According to still another aspect of the present invention, a method for purifying gasified gas includes: reducing, through a filter, an amount of soot and dust in the gasified gas obtained in a gasifier; cleaning, using a wet scrubber, the gasified gas that has been subjected to a CO shift reaction; reducing amounts of carbon dioxide and hydrogen sulfide in the gasified gas; and causing CO in the gasified gas to undergo the CO shift reaction to convert the CO to $CO_2$ in the presence of a low concentration of hydrogen sulfide using the CO shift catalyst, whereby purified gas is obtained.

Advantageous Effects of Invention

According to the present invention, the CO shift reaction is allowed to proceed even when the concentration of $H_2S$ is low.

DESCRIPTION OF EMBODIMENT

Hereinafter, the present invention will be described in detail with reference to the drawings. However, the present invention is not limited to an embodiment described below. The components in the following embodiment include those readily apparent to persons skilled in the art and those substantially similar thereto.

Embodiment

Figure 1:
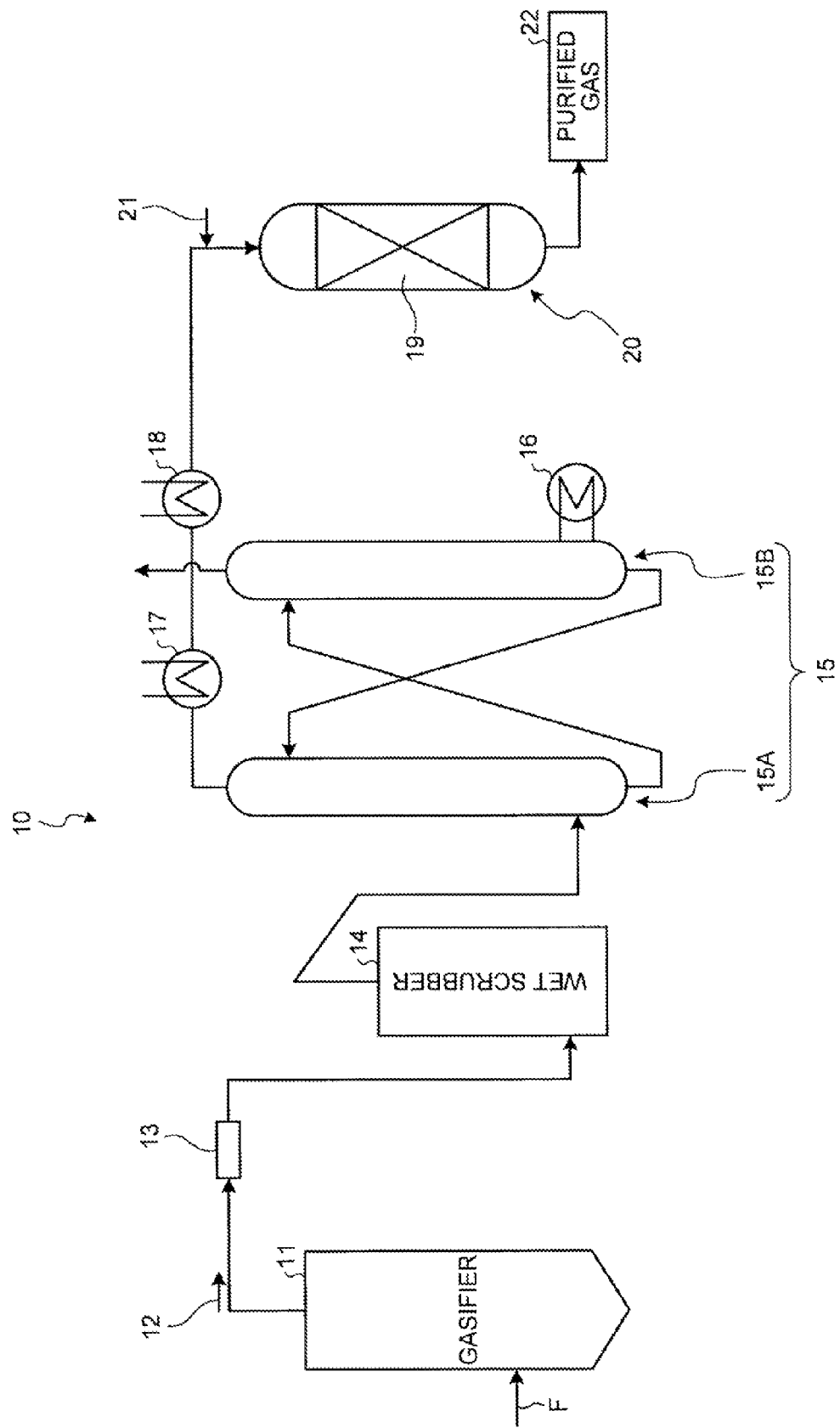
FIG. 1 is a schematic diagram of a gasified gas purification system including a CO shift reactor filled with a CO shift catalyst according to an embodiment.

A CO shift catalyst according to an embodiment of the present invention and a CO shift reactor using the CO shift catalyst will be described with reference to the drawings. FIG. 1 is a schematic diagram of a gasified gas purification system that includes a CO shift reactor filled with a CO shift catalyst.

As illustrated in FIG. 1, the gasified gas purification system 10 includes: a gasifier 11 that gasifies coal used as fuel F; a filter 13 that reduces the amount of soot and dust in the gasified gas 12 (synthesis gas); a wet scrubber 14 that reduces the amount of halogen in the gasified gas 12 that have passed through the filter 13; a gas purification apparatus 15 that includes an absorber 15A for absorbing $CO_2$ and $H_2S$ contained in the heat-exchanged gasified gas 12 to reduce the amounts of the $CO_2$ and $H_2S$, a regenerator 15B for regenerating the $CO_2$ and $H_2S$, and a regenerative super heater 16 disposed on the regenerator 15B; first and second heat exchangers 17 and 18 that raise the temperature of the gasified gas 12; and a CO shift reactor 20 including a CO shift catalyst 19 that converts CO in the gasified gas 12 heated to a temperature of 300° C. into $CO_2$ to produce purified gas 22. In FIG. 1, reference numeral 21 denotes steam.

The CO shift catalyst according to the present invention is a CO shift catalyst that reforms carbon monoxide (CO) contained in gas. The CO shift catalyst contains: active ingredients including one of molybdenum (Mo) and iron (Fe) as a main ingredient and one of nickel (Ni) and ruthenium (Ru) as an accessory ingredient; and one or at least two oxides of titanium (Ti), zirconium (Zr), and cerium (Ce) as a carrier supporting the active ingredients.

By using any one of titanium (Ti), zirconium (Zr), and cerium (Ce) as the carrier, the catalyst provided can have excellent low-temperature activity, and therefore the CO shift reaction is allowed to proceed efficiently even when the amount of steam is reduced (the CO shift reaction is allowed to proceed at a significantly reduced temperature (for example, at a temperature reduced from 350° C. to about 250° C.)).

Preferably, the carrier is any of oxides including $TiO_2$, $ZrO_2$, and $CeO_2$.

The carrier may contain a complex oxide including at least two of the above elements. The carrier may contain a complex oxide and any mixture.

Examples of the complex oxide obtained as above include $TiO_2$—$ZrO_2$, $TiO_2$—$CeO_2$, and $CeO_2$—$ZrO_2$.

The amount of supported molybdenum (Mo) or iron (Fe) used as the main ingredient is preferably 0.1 to 25% by weight and more preferably 5 to 22% by weight. The amount of supported nickel (Ni) or ruthenium (Ru) used as the accessory ingredient is preferably 0.01 to 10% by weight and more preferably 3 to 10% by weight. When ruthenium (Ru) is used, the amount thereof is still more preferably 0.01 to 1.5% by weight.

In the present invention, the CO shift reactor 20 including the CO shift catalyst 19 is used to allow the CO shift reaction to proceed at a low $H_2S$ concentration to obtain purified gas 22.

The chemical equilibrium formula during catalytic sulfurization using the CO shift catalyst will be described.

The following formula (2) is a reaction formula representing the reaction of molybdenum oxide with hydrogen sulfide to produce molybdenum sulfide.

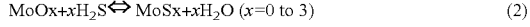

$$\text{MoOx} + x\text{H}_2\text{S} \Leftrightarrow \text{MoSx} + x\text{H}_2\text{O} \quad (x=0 \text{ to } 3) \qquad (2)$$

1) The CO shift catalyst during catalytic action takes a form of a mixture of molybdenum oxide and molybdenum sulfide.

2) The catalytic activity and the degree of sulfurization (indicating the ratio of the sulfide) correlate to each other, and the catalytic activity is low when the degree of sulfurization is low.

3) According to the Le Chatelier's principle, when the partial pressure of $H_2S$ in the system is low, the equilibrium composition sifts to the left hand side of the above formula (2). Therefore, the amount of molybdenum sulfide is reduced, and the activity tends to be lowered.

4) Since a Mo—Ni-based catalyst of the present invention contains a Ni element as an accessory ingredient, the molybdenum sulfide can be stabilized even at a low $H_2S$ concentration. Therefore, even when the partial pressure of $H_2S$ is low, the shift of the equilibrium composition to the left hand side of the formula (2) may be prevented, and the catalytic activity may thereby be maintained.

More specifically, when the CO shift reactor 20 is disposed on the downstream side of the gas purification apparatus 15 serving as an $H_2S/CO_2$ recovery apparatus, the $H_2S$ concentration is 0.1 to 100 ppm, and the Ni catalyst used as the accessory ingredient prevents the equilibrium from shifting to the left hand side of the above formula (2). Therefore, the catalytic activity is maintained to a high level. In addition, the S resistance is high, and the use of a carrier having a large specific surface area allows the catalytic activity to be stabilized.

Figure 2:
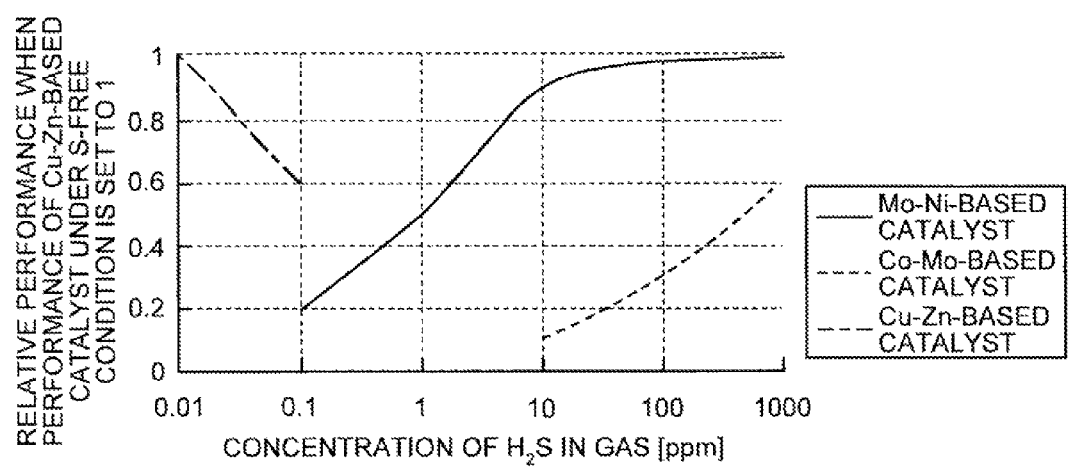
FIG. 2 is a graph showing the relationship between catalytic activity and the concentration of $H_2S$.
Figure 3:
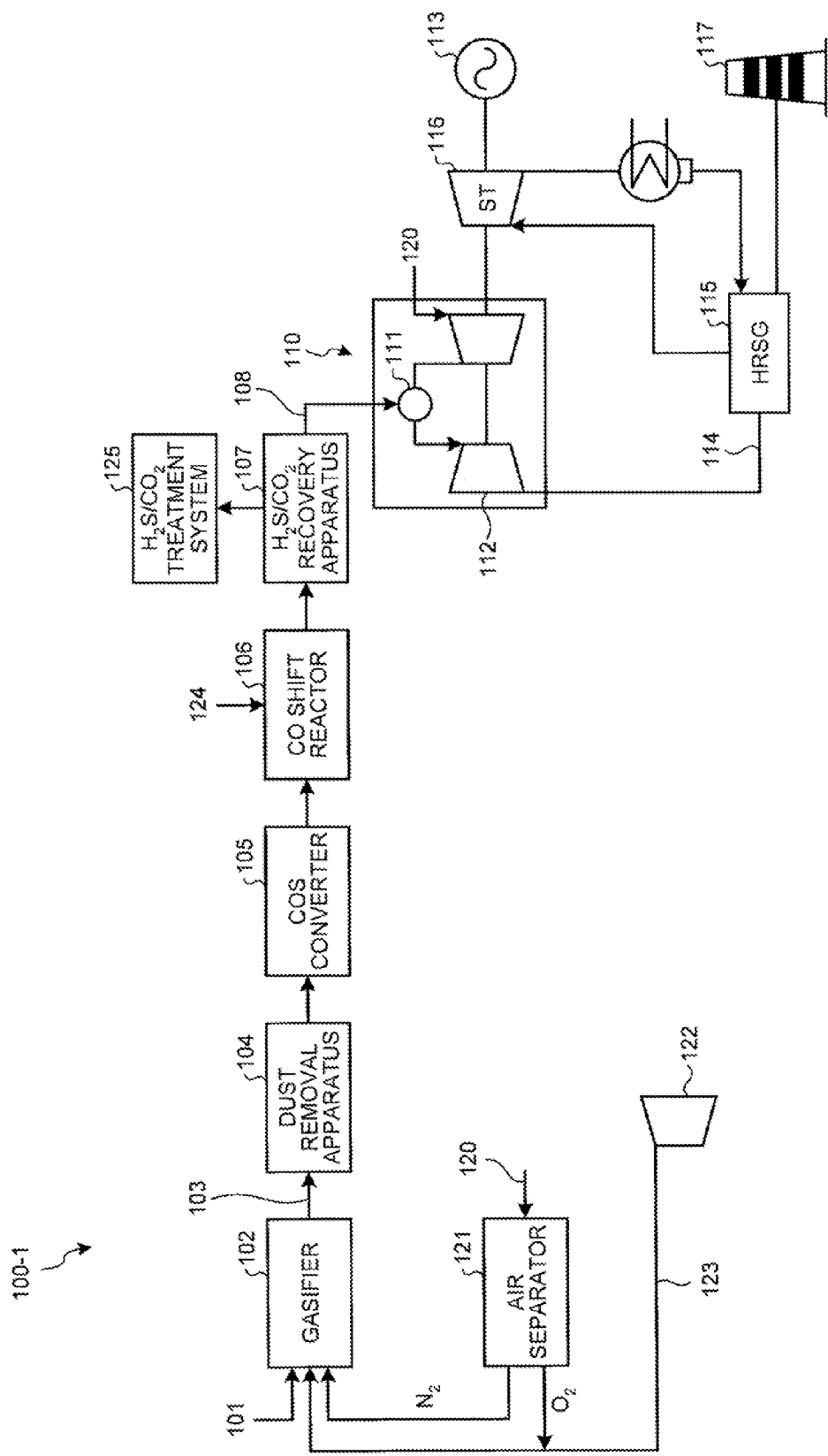
FIG. 3 is an explanatory diagram illustrating a coal gasification power plant.
Figure 4:
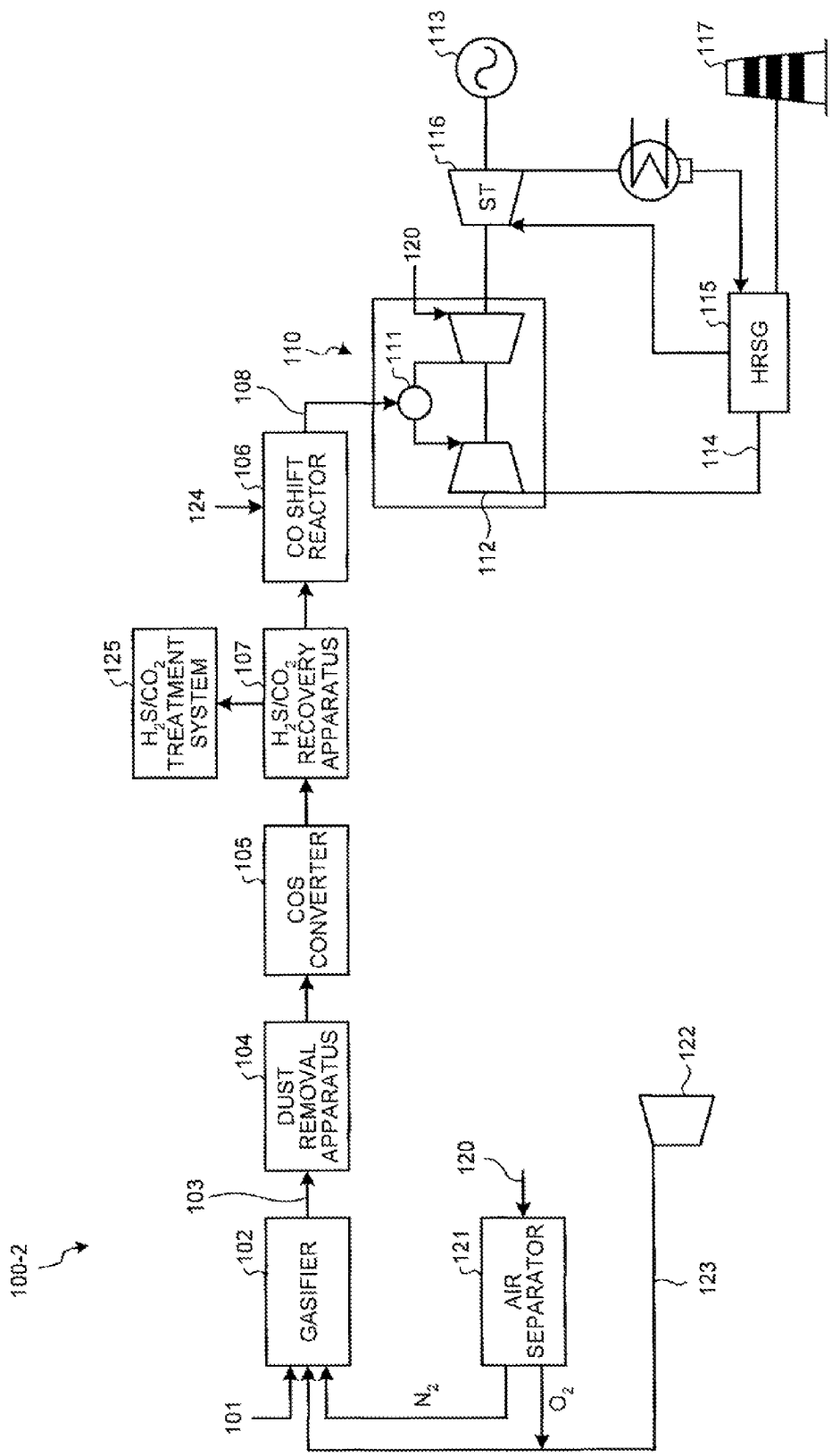
FIG. 4 is an explanatory diagram illustrating another coal gasification power plant.

FIG. 2 is a graph showing the relationship between the catalytic activity and the $H_2S$ concentration. In FIG. 2, the vertical axis represents relative performance when the performance of a Cu—Zn-based catalyst under an S-free condition is set to 1, and the horizontal axis represents the concentration (ppm) of $H_2S$ in gas.

As shown in FIG. 2, the Mo—Ni-based catalyst according to the present invention exhibits catalytic activity even when the $H_2S$ concentration is very low, i.e., about 0.1 ppm. When the $H_2S$ concentration is 10 to 1,000 ppm, the relative value of the activity is as high as 0.9 or higher.

However, a Co—Mo-based catalyst exhibits low relative activity, i.e., 0.3 or lower, when the $H_2S$ concentration is 10 to 100 ppm.

As can be seen from FIG. 2, the Mo—Ni-based catalyst according to the present invention exhibits catalytic activity even when the $H_2S$ concentration is very low.

As described above, with the CO shift catalyst according to the present invention, when CO in the gasified gas 12 gasified in the gasifier 11 is converted into $H_2$, the shift reaction is allowed to proceed even when the $H_2S$ concentration on the downstream side of the gas purification apparatus 15 is low, and therefore a highly efficient gas purification process can be provided.

Test Examples

Hereinafter, test examples showing the advantageous effects of the present invention will be described.

1) Method of Producing Catalyst 1 [Impregnation (IMP) Method]

100 g of titanium dioxide ($TiO_2$ (product name: "MC-90")) produced by ISHIHARA SANGYO KAISYA, LTD. was placed on a porcelain dish, and nickel nitrate hexahydrate (NN) and ammonium molybdate tetrahydrate (MA) dissolved in 150 mL of water were added such that the amounts of supported NiO and $MoO_3$ were 5% by weight and 15% by weight, respectively, based on the total amount of powder to be finally obtained. Then the mixture on the porcelain dish was subjected to evaporation to dryness and impregnation. The obtained powder was completely dried in a drier and then fired at 500° C. for 3 hours (the rate of temperature rise: 100° C./h) to obtain a powdered catalyst.

The obtained catalyst powder was compacted using a 30-ton pressure molding apparatus, pulverized to a particle diameter of 2 to 4 mm, and then sieved to obtain a catalyst 1.

2) Method of Producing Catalyst 2 [Precipitation (PR) Method]

100 g of titanium dioxide ($TiO_2$ (product name: "MC-90")) produced by ISHIHARA SANGYO KAISYA, LTD. was added to a beaker containing 3 L of water, and nickel nitrate hexahydrate was added such that the amount of NiO was 5% by weight based on the total amount of powder to be finally obtained.

The contents of the beaker were stirred to dissolve the nickel nitrate. Then a solution obtained by dissolving 2.5 mol % of sodium carbonate in 2 L of water was added dropwise to the mixture under continuous stirring to form a precipitate.

Next, ammonium molybdate tetrahydrate was added such that the amount of supported $MoO_3$ was 15% by weight based on the total amount of powder to be finally obtained, and the mixture was stirred and dissolved.

A 1N aqueous nitric acid solution was added dropwise under continuous stirring to form a precipitate.

Finally, the mixture was washed and filtered using a centrifuge, dried, and fired at 500° C. for 3 hours (the rate of temperature rise: 100° C./h) to obtain a powdered catalyst.

The obtained catalyst powder was compacted using a 30-ton pressure molding apparatus, pulverized to a particle diameter of 2 to 4 mm, and then sieved to obtain a catalyst 2.

3) Method of Producing Catalyst 3 [Impregnation (IMP) Method]

100 g of 10% by weight $ZrO_2/TiO_2$ produced by DAIICHI KIGENSO KAGAKU KOGYO Co., Ltd. was placed on a porcelain dish, and nickel nitrate hexahydrate and ammonium molybdate tetrahydrate dissolved in 150 mL of water were added such that the amounts of supported NiO and $MoO_3$ were 5% by weight and 15% by weight, respectively, based on the total amount of powder to be finally obtained. Then the mixture on the porcelain dish was subjected to evaporation to dryness and impregnation. The obtained powder was completely dried in a drier and then fired at 500° C. for 3 hours (the rate of temperature rise: 100° C./h) to obtain a powdered catalyst.

The obtained catalyst powder was compacted using a 30-ton pressure molding apparatus, pulverized to a particle diameter of 2 to 4 mm, and then sieved to obtain a catalyst 3.

4) Method of Producing Catalyst 4 [Impregnation (IMP) Method]

100 g of $CeO_2$ produced by DAIICHI KIGENSO KAGAKU KOGYO Co., Ltd. was placed on a porcelain dish, and nickel nitrate hexahydrate and ammonium molybdate tetrahydrate dissolved in 150 mL of water were added such that the amounts of supported NiO and $MoO_3$ were 6% by weight and 20% by weight, respectively, based on the total amount of powder to be finally obtained. Then the mixture on the porcelain dish was subjected to evaporation to dryness and impregnation. The obtained powder was completely dried in a drier and then fired at 500° C. for 3 hours (the rate of temperature rise: 100° C./h) to obtain a powdered catalyst.

The obtained catalyst powder was compacted using a 30-ton pressure molding apparatus, pulverized to a particle diameter of 2 to 4 mm, and then sieved to obtain a catalyst 4.

5) Method of Producing Catalyst 5 [Impregnation (IMP) Method]

100 g of 80% by weight $CeO_2/ZrO_2$ produced by DAIICHI KIGENSO KAGAKU KOGYO Co., Ltd. was placed on a porcelain dish, and nickel nitrate hexahydrate and ammonium molybdate tetrahydrate dissolved in 150 mL of water were added such that the amounts of supported NiO and $MoO_3$ were 6% by weight and 14% by weight, respectively, based on the total amount of powder to be finally obtained. Then the mixture on the porcelain dish was subjected to evaporation to dryness and impregnation. The obtained powder was completely dried in a drier and then fired at 500° C. for 3 hours (the rate of temperature rise: 100° C./h) to obtain a powdered catalyst. The obtained catalyst powder was compacted using a 30-ton pressure molding apparatus, pulverized to a particle diameter of 2 to 4 mm, and then sieved to obtain a catalyst 5.

6) Method of Producing Catalyst 6 [Impregnation (IMP) Method]

100 g of titanium dioxide ($TiO_2$ (product name: "MC 90")) produced by ISHIHARA SANGYO KAISYA, LTD. was placed on a porcelain dish, and an aqueous solution of ruthenium nitrate (RN) and iron(II) nitrate hexahydrate (FN) dissolved in 100 mL of water were added such that the amounts of supported Ru and FeO were 1% by weight and 17% by weight, respectively, based on the total amount of powder to be finally obtained. Then the mixture on the porcelain dish was subjected to evaporation to dryness and impregnation. The obtained powder was completely dried in a drier and then fired at 500° C. for 3 hours (the rate of temperature rise: 100° C./h) to obtain a powdered catalyst. The obtained catalyst powder was compacted using a 30-ton pressure molding apparatus, pulverized to a particle diameter of 2 to 4 mm, and then sieved to obtain a catalyst 6.

7) Method of Producing Catalyst 7 [Impregnation (IMP) Method]

100 g of 10% by weight $CeO_2/TiO_2$ produced by DAIICHI KIGENSO KAGAKU KOGYO Co., Ltd. was placed on a porcelain dish, and nickel nitrate hexahydrate (NN) and iron (III) nitrate hexahydrate (FN) dissolved in 100 mL of water were added such that the amounts of supported Ni and $Fe_2O_3$ were 9% by weight and 17% by weight, respectively, based on the total amount of powder to be finally obtained. Then the mixture on the porcelain dish was subjected to evaporation to dryness and impregnation. The obtained powder was completely dried in a drier and then fired at 500° C. for 3 hours (the rate of temperature rise: 100° C./h) to obtain a powdered catalyst. The obtained catalyst powder was compacted using a 30-ton pressure molding apparatus, pulverized to a particle diameter of 2 to 4 mm, and then sieved to obtain a catalyst 7.

8) Method of Producing Comparative Catalyst 1 [Impregnation (IMP) Method]

100 g of γ-$Al_2O_3$ (A-11) produced by Sumitomo Chemical Co., Ltd. was placed on a porcelain dish, and cobalt nitrate hexahydrate (CN) and ammonium molybdate tetrahydrate (MA) dissolved in 150 mL of water were added such that the amounts of supported CoO and $MoO_3$ were 4% by weight and 13% by weight, respectively, based on the total amount of powder to be finally obtained. Then the mixture on the porcelain dish was subjected to evaporation to dryness and impregnation. The obtained powder was completely dried in a drier and then fired at 500° C. for 3 hours (the rate of temperature rise: 100° C./h) to obtain a powdered catalyst.

The obtained catalyst powder was compacted using a 30-ton pressure molding apparatus, pulverized to a particle diameter of 2 to 4 mm, and then sieved to obtain a comparative catalyst 1 (C1).

9) Method of Producing Comparative Catalyst 2 [Coprecipitation (CPR) Method]

Sodium carbonate was dissolved in 2 L of water, and the solution was maintained at 60° C. This alkaline solution was used as a solution A. Separately, aluminum nitrate and zinc nitrate were dissolved in 400 mL of water, and this acidic solution was maintained at 60° C. and used as a solution B. Separately, copper nitrate (CUN) was dissolved in 400 mL of water, and this acidic solution was maintained at 60° C. and used as a solution C. The aluminum nitrate, zinc nitrate, and copper nitrate were added in a ratio of 50:15:35% by weight in terms of metal oxides, and the amount of sodium carbonate was two times the molar amounts of the aluminum nitrate, zinc nitrate, and copper nitrate added. The raw materials used in the above ratio were added such that the theoretical amount of a catalyst to be prepared was 100 g.

The preparation method is as follows. The solution B was added dropwise uniformly to the solution A over 30 minutes under stirring to obtain a precipitate-produced solution D. Then the solution C was added dropwise uniformly to the precipitate-produced solution D over 30 minutes to obtain a precipitate-produced solution F containing aluminum, zinc, and copper.

The precipitate-produced solution F was aged under stirring for 2 hours, and the resultant mixture was well washed so that the filtrate of the precipitate-produced solution F, Na ions, and NO ions were not detected. Then the product was dried at 100° C. for 24 hours and fired at 300° C. for 3 hours to obtain a comparative catalyst powder. The obtained comparative catalyst powder was compacted using a 30-ton pressure molding apparatus, pulverized to a particle diameter of 2 to 4 mm, and then sieved to obtain a comparative catalyst 2 (C2).

The catalysts were evaluated as follows.

In the evaluation test, a tubular reaction tube having an inner diameter of 14 mm was filled with 3.3 cc of one of the catalysts, and its catalytic activity was evaluated using a flow-type microreactor. The catalytic activities were compared using a parameter defined as a CO conversion rate shown in Table 2 below or a change in gas flow rate between the inlet and outlet of a catalytic layer.

The composition of the gas was $H_2/CO/CO_2/H_2O$=17/24/11/48% by mole, $H_2S$=20 ppm, and S/CO=2.0. The test was performed under the conditions of 0.9 MPa and a temperature of 250° C. The evaluation conditions are shown in Table 2. The CO conversion rate was computed using an equation shown below Table 2.

A list of the compositions of the catalysts and the results of the test are shown in Table 1.

TABLE 1

| CATALYST NUMBER | ACTIVE INGREDIENT | | | | | |
|---|---|---|---|---|---|---|
| | METAL | AMOUNT SUPPORTED (wt %) | STARTING SALT | METAL | AMOUNT SUPPORTED (wt %) | STARTING SALT |
| 1 | Mo | 15 | MA | Ni | 5 | NN |
| 2 | Mo | 15 | MA | Ni | 5 | NN |
| 3 | Mo | 15 | MA | Ni | 5 | NN |
| 4 | Mo | 20 | MA | Ni | 6 | NN |
| 5 | Mo | 14 | MA | Ni | 6 | NN |
| 6 | Fe | 17 | FN(II) | Ru | 1 | RN |
| 7 | Fe | 17 | FN(III) | Ni | 9 | NN |
| C1 | Mo | 13 | MA | Co | 4 | CN |
| C2 | Cu | 35 | CUN | Zn | 15 | ZN |

TABLE 1-continued

| CATALYST NUMBER | CARRIER COMPONENT (OXIDE) | PREPARATION METHOD | SPECIFIC SURFACE AREA (m²/g) INITIAL → AFTER 200 h DURABILITY TEST | CO CONVERSION RATE (%) at 250° C. INITIAL → AFTER 200 h DURABILITY TEST |
|---|---|---|---|---|
| 1 | Ti | IMP | 120 → 111 | 95 → 90 |
| 2 | Ti | PR | 115 → 102 | 93 → 88 |
| 3 | Zr/Ti | IMP | 98 → 90 | 82 → 71 |
| 4 | Ce | IMP | 40 → 36 | 93 → 85 |
| 5 | Ce/Zr | IMP | 76 → 69 | 92 → 86 |
| 6 | Ti | IMP | 112 → 99 | 76 → 70 |
| 7 | Ce/Ti | IMP | 45 → 43 | 59 → 56 |
| C1 | Al | IMP | 94 → 35 | 57 → 39 |
| C2 | Al | CPR | 50 → 20 | 2 → 0 |

TABLE 2

| CONDITIONS FOR EVALUATING CATALYST | |
|---|---|
| TEMPERATURE | 250° C. |
| PRESSURE | 0.9 MPa |
| GHSV (FLOW RATE OF GAS) | 5,000 h⁻¹ (16.6 L/h) |
| COMPOSITION OF GAS | $H_2/CO/CO_2/H_2O$ = 17/24/11/48 mol % |

CO conversion rate (%)=(1−(flow rate of CO gas at outlet of catalyst layer (mol/h))/(flow rate of CO gas at inlet of catalyst layer (mol/h)))×100

As shown in Table 1, the activities of the catalysts in the test examples were high even at a low $H_2S$ concentration (20 ppm), and the CO conversion rates of all the catalysts were high. Particularly, the initial activities of Mo—Ni-based catalysts of the catalysts 1 to 5 were high, and a reduction in CO conversion rate after the 200-hour durability test was very low.

However, in the comparative catalyst 1 in a comparative example, the CO conversion rate was significantly reduced. The comparative catalyst 2 exhibited almost no activity.

| Reference Signs List | |
|---|---|
| 10 | gasified gas purification system |
| 11 | gasifier |
| 12 | gasified gas |
| 13 | filter |
| 14 | wet scrubber |
| 15A | absorber |
| 15B | regenerator |
| 15 | gas purification apparatus |
| 16 | regenerative super heater |
| 17 | first heat exchanger |
| 18 | second heat exchanger |
| 19 | CO shift catalyst |
| 20 | CO shift reactor |
| 22 | purified gas |

The invention claimed is:

1. A CO shift catalyst that reforms carbon monoxide (CO) in a gas, the CO shift catalyst comprising:
   active ingredients including one of molybdenum (Mo) and iron (Fe) as a main ingredient and one of nickel (Ni) and ruthenium (Ru) as an accessory ingredient; and
   a carrier supporting the active ingredients, wherein
   the carrier is any one of the following:
   oxide of titanium (Ti);
   oxide of zirconium (Zr);
   a complex oxide of titanium (Ti) and zirconium (Zr);
   a complex oxide of titanium (Ti) and cerium (Ce); and
   a complex oxide of zirconium (Zr) and cerium (ce); and
   wherein an amount of the supported main ingredient of the active ingredients is 0.1 to 25% by weight, and an amount of the supported accessory ingredient is 0.01 to 1.5% by weight.

2. A CO shift reactor comprising a reactor filled with the CO shift catalyst according to claim 1.

3. A method for purifying gasified gas, comprising:
   reducing, through a filter, an amount of soot and dust in the gasified gas obtained in a gasifier;
   cleaning, using a wet scrubber, the gasified gas;
   reducing amounts of carbon dioxide and hydrogen sulfide in the gasified gas; and
   causing CO in the gasified gas to undergo the CO shift reaction to convert the CO to $CO_2$ in the presence of a low concentration of hydrogen sulfide using the CO shift catalyst according to claim 1, whereby purified gas is obtained.

* * * * *